Patented Aug. 17, 1948

2,447,414

UNITED STATES PATENT OFFICE 2,447,414

OXIDATION OF ISOPROPYLBIPHENYL

Milton Kosmin and William S. Emerson, Dayton, Ohio, assignors to Monsanto Chemical Company, St. Louis, Mo., a corporation of Delaware No Drawing. Application January 18, 1946, Serial No. 642,137

4 Claims. (Cl. 260—592)

This invention relates to a process for oxidizing isopropylbiphenyl and more specifically provides an improved process for obtaining phenyl acetophenone and dimethylxenyl carbinol by an improved liquid phase catalytic oxidation process.

It has hitherto been proposed, for example, in Patents Nos. 1,813,606 and 2,245,528 to conduct the catalytic oxidation of such hydrocarbons as isopropylbenzene in the presence of salts or oxides of heavy metals to produce carbinols and ketones. We have found, however, that the percentage conversions obtained, according to the processes described in the prior art, as well as the cost of the catalyst previously employed, render the process commercially unfavorable when applied specifically to isopropylbiphenyl. Moreover, some of the previous catalysts employed give greater conversions to acids than to the ketone and carbinol, thus materially decreasing the yields of the desired products.

Although a great many catalysts, some of them being of an extremely complex composition, have been tested for the oxidation of isopropylbenzene, we have found that the reaction is best carried out by conducting the reaction in the presence of hydrated lime, i. e., either a pure or a technical grade of calcium hydroxide.

The herein-described process may be applied either to p-isopropenylbiphenyl, m-isopropenylbiphenyl or to a mixture of the two in any proportion.

The invention is illustrated, but not limited, by the following examples:

Example 1

This example illustrates the method as applied to the oxidation of isopropylbiphenyl to phenyl-acetophenone and dimethylxenyl carbinol. The apparatus employed consisted of a 500 cc. 3-necked, round bottom flask equipped with a gas dispersing inlet, a thermometer and condenser. 392 g. of a mixture of isomeric isopropylbiphenyl (meta and para formed by the Friedel-Crafts alkylation of biphenyl with propylene) and 3.9 g. of calcium hydroxide were placed into the flask and air was then drawn through the mixture by suction, while stirring, for a period of 24 hours, the temperature of the reaction mixture being maintained at 165° C. to 170° C. At the end of the oxidation period the reaction mixture was filtered in order to remove the calcium hydroxide, then washed with sodium carbonate in order to neutralize and remove any acid formed and finally washed with water. Fractionation of the product so obtained gave the following cuts:

| Cut No. | Boiling Range | Vac., mm. | Wt. of Total Cut, g. | Wt. of Ketone in Cut, g. | Wt. of Isopropenylbiphenyl in Cut, g. | Wt. of Carbinol, g. |
|---|---|---|---|---|---|---|
| 1 | 136–150 | 12 | 6.6 | | | |
| 2 | 150–160 | 12 | 136.0 | | 8.1 | |
| 3 | 160–170 | 12 | 22.2 | 2.2 | 11.1 | 8.9 |
| 4 | 136–160 | 3 | 32.4 | 18.5 | 11.0 | 2.9 |
| 5 | 150–172 | 3–4 | 130.5 | 115.0 | 14.6 | 100.4 |
| 6 | Residue | | 56.1 | | | |

The isopropenylbiphenyl results from the dehydration of the intermediately formed dimethylxenyl carbinol which is dehydrated during distillation.

The above results indicate that a conversion of 35.8% of isopropylbiphenyl to ketone and a 11.9% conversion to dimethylxenyl carbinol was obtained. The total conversion to the ketone and carbinol was 47.7%. The oxidation is isopropylbiphenyl may also be obtained at superatmospheric pressures, i. e., pressures in excess of atmospheric and preferably in the neighborhood of about 100 lbs./sq. in. when carried out in the presence of calcium hydroxide.

In place of air we may also employ as the oxidizing gas, pure oxygen, in which case a somewhat greater conversion of isopropylbiphenyl to the corresponding ketone and carbinol will be obtained.

Example 2

A mixture of m- and p-isopropylbiphenyl weighing 784 g., together with 8.0 g. of Ca(OH)$_2$ was placed in an oxidation flask and a stream of substantially pure oxygen gas passed through the hydrocarbon. The temperature was raised to 136° C. by the application of heat, at which latter point the oxidation commenced, causing the temperature to rise to 173° C. At this point the heat developed by the reaction was sufficient to maintain the temperature at 170° C. to 172° C. until the reaction was almost complete. In order to complete the reaction, heat was applied at the end at such a rate as to maintain the temperature at about 170° C. The reaction was complete after about 5 hours.

The oxidation product was washed well with water, then with a sodium carbonate solution and again with water. The washed product was then fractionated, giving the following cuts:

| Cut No. | Boiling Range | Press., mm. | Weight | Percent Ketone | Percent Isopropenylbiphenyl |
|---|---|---|---|---|---|
| 1 | 130-163 | 21.5 | 15.1 | 19.5 | |
| 2 | 163-170 | 21.5-22.0 | 252.0 | 3.5 | 8.2 |
| 3 | 170-180 | 20 | 20.5 | 5.5 | 36.2 |
| 4 | 140-160 | 5 | 33.1 | 14.4 | 57.2 |
| 5 | 160-180 | 5.0-7.5 | 366.3 | 61.9 | 18.7 |
| 6 | Residue | | 81.2 | | |

The fractions as obtained above were combined and the percentage content of phenylacetophenone or acetobiphenyl, isopropenylbiphenyl and dimethylxenyl carbinol determined in the combined product.

Based on the content of the oxidation product, the conversion and yield obtained were as follows:

| | Conversion | Yield |
|---|---|---|
| | Per cent | Per cent |
| Ketone | 29.6 | 42.8 |
| Isopropenylbiphenyl | 15.0 | 21.6 |
| Carbinol | 9.4 | 13.6 |
| Total | 54.0 | 78.0 |

As will be apparent to those skilled in the art, the selection of optimum temperatures, pressure and other reaction conditions may be somewhat varied. Generally, conditions which give optimum yields of ketone and carbinol in the presence of previously employed catalysts give good results when operating in the presence of calcium hydroxide.

The temperature employed for the oxidation should be maintained at a point above decomposition temperature of peroxides, which compounds may form at temperatures below 80° C. to 85° C. Suitable temperatures for reaction when it is carried out at atmospheric pressure may be within the range of from 100° C. up to the boiling point of the hydrocarbon at atmospheric pressure, which, in the case of isopropylbiphenyl, is 175° C. It is, of course, not necessary that the process be restricted to operation at atmospheric pressure since satisfactory operation may also be obtained at pressures below normal atmospheric pressure as well as pressures above atmospheric. Reaction may also be effected in the presence or absence of a diluent or solvent for either the hydrocarbon employed or the products obtained. Also, while we prefer to use air as the oxidizing gas, we may also use pure oxygen or a mixture of oxygen with any inert gas.

What we claim is:

1. The process which includes contacting isopropylbiphenyl at a temperature below its boiling point with gaseous oxygen in the presence of an oxidation catalyst consisting of calcium hydroxide, and recovering from the oxidation product phenyl acetophenone.

2. The process which includes contacting isopropylbiphenyl at a temperature above 80° C. but below its boiling point with molecular oxygen in the presence of an oxidation catalyst consisting of calcium hydroxide, and recovering from the oxidation product phenyl acetophenone.

3. The process which includes contacting isopropylbiphenyl at a temperature above 80° C. but below its boiling point with molecular oxygen in the presence of an oxidation catalyst consisting of calcium hydroxide and recovering from the oxidation product phenyl acetophenone and dimethylxenyl carbinol.

4. The process which includes contacting isopropylbiphenyl at a temperature of about 165° C. to 175° C. with atmospheric air in the presence of an oxidation catalyst consisting solely of calcium hydroxide and recovering from the oxidation product phenyl acetophenone and dimethylxenyl carbinol.

MILTON KOSMIN.
WILLIAM S. EMERSON.

REFERENCES CITED

The following references are of record in the file of this patent:

UNITED STATES PATENTS

| Number | Name | Date |
|---|---|---|
| 1,813,606 | Binapfl | July 7, 1931 |